Aug. 23, 1938.   R. C. PRATT   2,128,163
SPRING CONTROLLED VENETIAN BLIND
Original Filed July 21, 1932   8 Sheets-Sheet 1

Fig.1.

INVENTOR.
R. C. Pratt,
BY Wm. F. Freudenreich,
ATTORNEY.

Aug. 23, 1938.    R. C. PRATT    2,128,163
SPRING CONTROLLED VENETIAN BLIND
Original Filed July 21, 1932    8 Sheets-Sheet 3

INVENTOR.
R. C. Pratt,
BY Wm. F. Freudenreich,
ATTORNEY.

Aug. 23, 1938.  R. C. PRATT  2,128,163
SPRING CONTROLLED VENETIAN BLIND
Original Filed July 21, 1932   8 Sheets-Sheet 5

INVENTOR.
R. C. Pratt,
BY Wm F. Freudenreich,
ATTORNEY.

Aug. 23, 1938.   R. C. PRATT   2,128,163
SPRING CONTROLLED VENETIAN BLIND
Original Filed July 21, 1932   8 Sheets-Sheet 6

INVENTOR.
R. C. Pratt,
BY Wm. F. Freudenreich,
ATTORNEY.

Aug. 23, 1938.   R. C. PRATT   2,128,163
SPRING CONTROLLED VENETIAN BLIND
Original Filed July 21, 1932   8 Sheets-Sheet 8

INVENTOR.
R. C. Pratt,
BY Wm F. Freudenreich,
ATTORNEY.

Patented Aug. 23, 1938

2,128,163

UNITED STATES PATENT OFFICE 2,128,163

SPRING CONTROLLED VENETIAN BLIND

Raymond C. Pratt, Chicago, Ill., assignor, by mesne assignments, to H. B. Dodge and Company, Chicago, Ill., a corporation of Illinois Application July 21, 1932, Serial No. 623,802
Renewed December 5, 1934

10 Claims. (Cl. 156—17)

The object of the present invention is to simplify and improve the supporting and controlling means for Venetian blinds, so as to adapt them to a much wider field of usefulness than they have heretofore enjoyed.

So far as I am aware, the raising and lowering of Venetian blinds has been accomplished by means of pull cords, chains and the like. One of the objects of the present invention is to adapt a blind of this type for operation by a spring roller, whereby it may be raised and lowered in the manner of an ordinary window shade.

In one of its forms my invention is adapted to be used as a window shade for railway cars and the like. Therefore, viewed in one of its aspects, my invention may be said to have for its object to produce a simple and novel construction whereby a Venetian blind may be hung from a spring roller similar to the shade rollers now employed in railway passenger cars and the raising and lowering thereof be controlled in the same manner as ordinary window shades in such cars.

A further object of the present invention is to produce a Venetian blind which, when used in a railway car, may serve as a ventilator and to admit air in such a direction that it will not blow directly upon the passenger beside the same.

A further object of the present invention is to produce a metal Venetian blind that will take up but little space when raised.

A further object of the invention is to lock a Venetian blind against swaying movements and consequent rattling when strong or gusty winds are blowing against the same or when a railway car equipped with the same is swaying or is running over a rough piece of track.

A further object of the present invention is to make it possible conveniently to shift the slats of a Venetian blind into any desired angular positions so as, for example, to permit a passenger to look out of a car window without enabling outsiders to look in; and, if desired, to lock the slats in any position into which they may be brought, while holding the blind as a whole substantially rigid.

A further object of the present invention is to produce a simple and novel all-metal Venetian blind which will be substantially noiseless in operating the same.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 5:
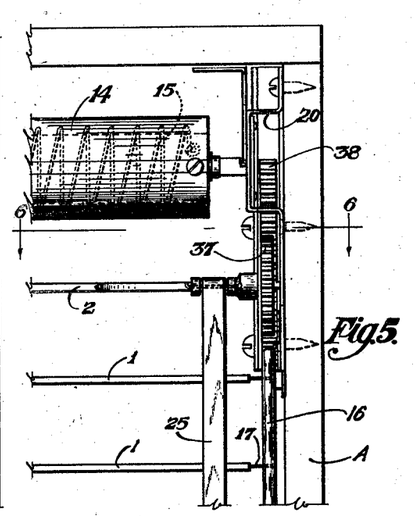
Fig. 5 is a rear elevation of the parts shown in Fig. 4.
Figure 11:
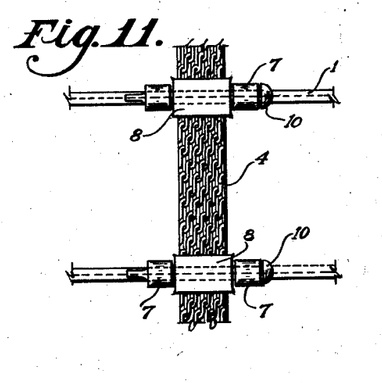
Fig. 11 is a front elevation of the parts shown in Fig. 10, only two slats appearing.
Figure 12:
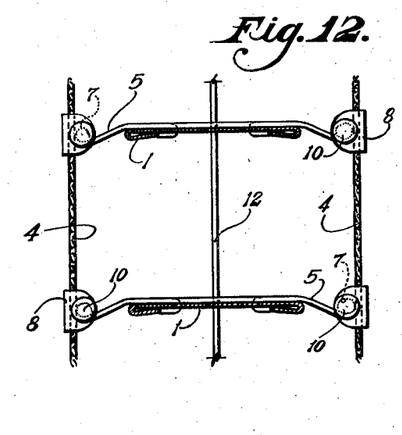
Fig. 12 is a section on line 12—12 of Fig. 10.
Figure 13:
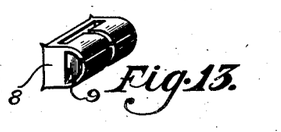
Fig. 13 is a perspective view of one of the clips that fasten the flexible chains to the slats.

Referring to Figs. 1–15, 1, 1 represent a series of slats illustrated as being made of sheet metal, which is the preferred form, although, in certain aspects of the invention, the material of which the slats is made is of no importance. Above the uppermost slat is a heavy slat or bar 2 that may conveniently be of the same length and width as the slats 1. Also, below the lowermost slat is a second flat bar 3 similar to the bar 2. The upper and lower bars are connected together at both their long edges, toward opposite ends, by means of flexible tape-like members 4, 4, each of which is also connected to each slat. The members 4, as best shown in Figs. 11 and 12, are bands or strips composed of many small metal links woven together and may therefore be regarded as metal webbing. The metal webbings are not connected directly to the slats and bars, but are hinged to the ends of plates 5 fixed to and extending transversely of the slats; each plate being longer than the width of a slat so as to project from both long edges of the latter. The central portions of each of the plates 5 are cut away at the ends to produce separated arms 6, 6. The outer or free ends of the arms are bent into the form of short tubes 7; the tubes at the same end of each plate being in axial alignment. The webbings are threaded through metal clips 8 each long enough to fit exactly between two of the tubular elements 7 at one end of one of the plates 5; each clip having, on what may be termed the rear or inner side, a tubular part 9 adapted to register with the two tubular elements 7 between which the clip may be placed. The webbings are clamped between the body portions of the clips and the tubular elements to cause the clips to be fixed thereto. By passing a pin 10 through two of the tubular elements 7 and the interposed tubular part 9 of the corresponding clip, a connection is effected between a slat or bar and one of the metal webbings. Each of the plates 5 and the corresponding slat, as well as each of the bars 2 and 3, has therein a large central opening 11 through which extends a thin flexible band or tape 12, preferably of steel. The lower end of each of these two bands or tapes is connected to a shade stick 13 which may be of any of the types commonly found on the shades of railway cars for the purpose of locking the shade in any adjusted position. The upper end of each of the tapes 12 is attached to a spring shade roller 14 which may be of any usual or suitable type. Where the shade stick serves frictionally or otherwise to lock the lower end of the shade or blind to the stationary framework of the window, the shade roller need simply contain a spring 15, as shown in Fig. 5, which constantly exerts a force tending to turn the roller in a direction to raise the blind.

Figure 14:
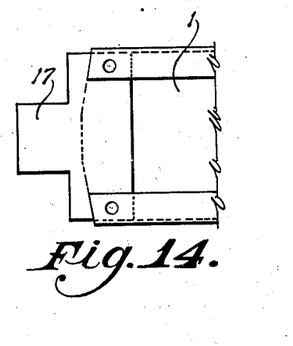
Fig. 14 is a bottom plan view of one end of one of the slats.
Figure 15:
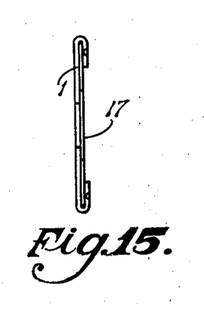
Fig. 15 is an end edge view of the slat appearing in Fig. 14.

The blind unit is shown as mounted on and supported by two vertical rails 16 secured to the inner sides of the side members of a window frame A. The rails are channel-shaped; the troughs or channels in the two rails facing each other. As best shown in Fig. 14, each slat may have fixed to its ends pieces 17 of fiber or other sound-deadening material; these pieces being so shaped that they will enter the troughs or channels in the rails and thus prevent the shade or blind from swinging or moving bodily toward the inside or the outside of the window. The shade stick 13 has at its ends shoes 18 that partially embrace the rails, whereby the shade stick may slide up and down but be held against movements in other directions. The lower tilting bar 3 is supported at its ends in bearings 19 on the shoes 18 for swinging or tilting movements around its long central axis. The shade roller and the upper tilting bar 2 are preferably mounted between separate brackets 20 and 21 fixed to the inner sides of the side members of the window frame, toward the top.

Figure 1:
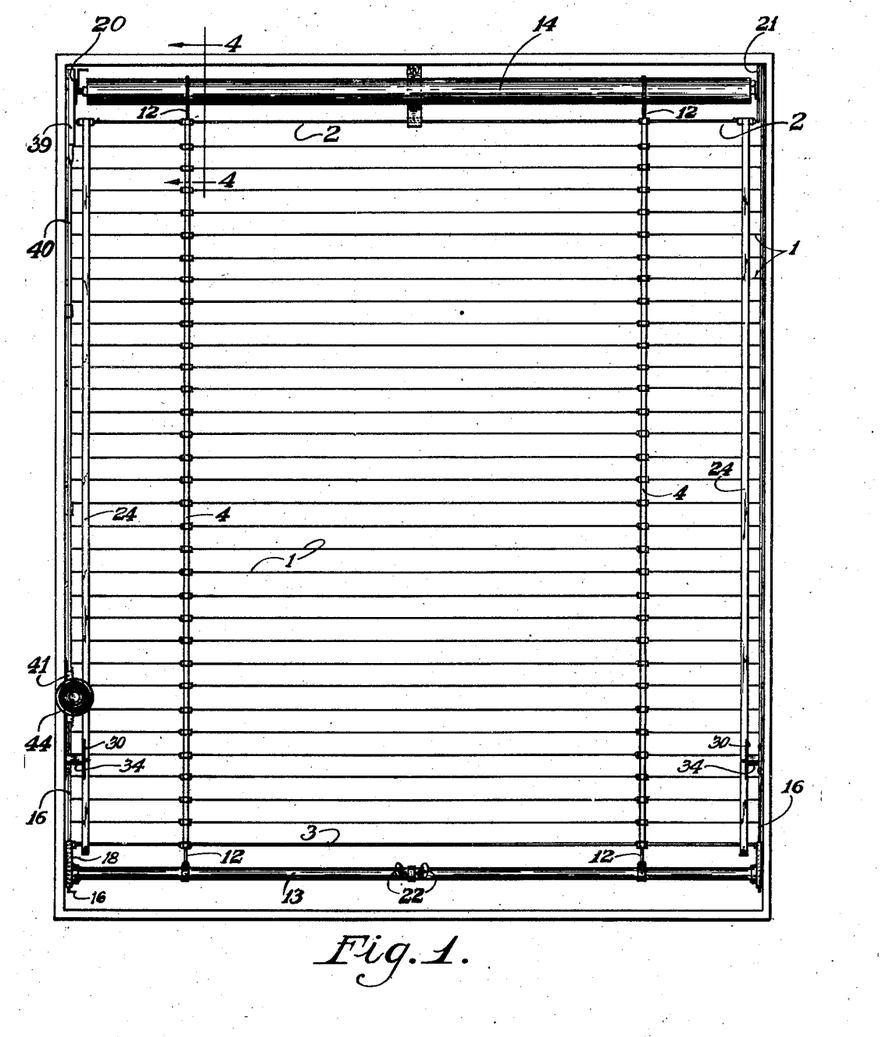
Figure 1 is a front elevation of one of my improved blinds, the slats being horizontal, together with so much of a surrounding window frame as is necessary to show the manner of mounting the blind in the latter.
Figures 2, 3:
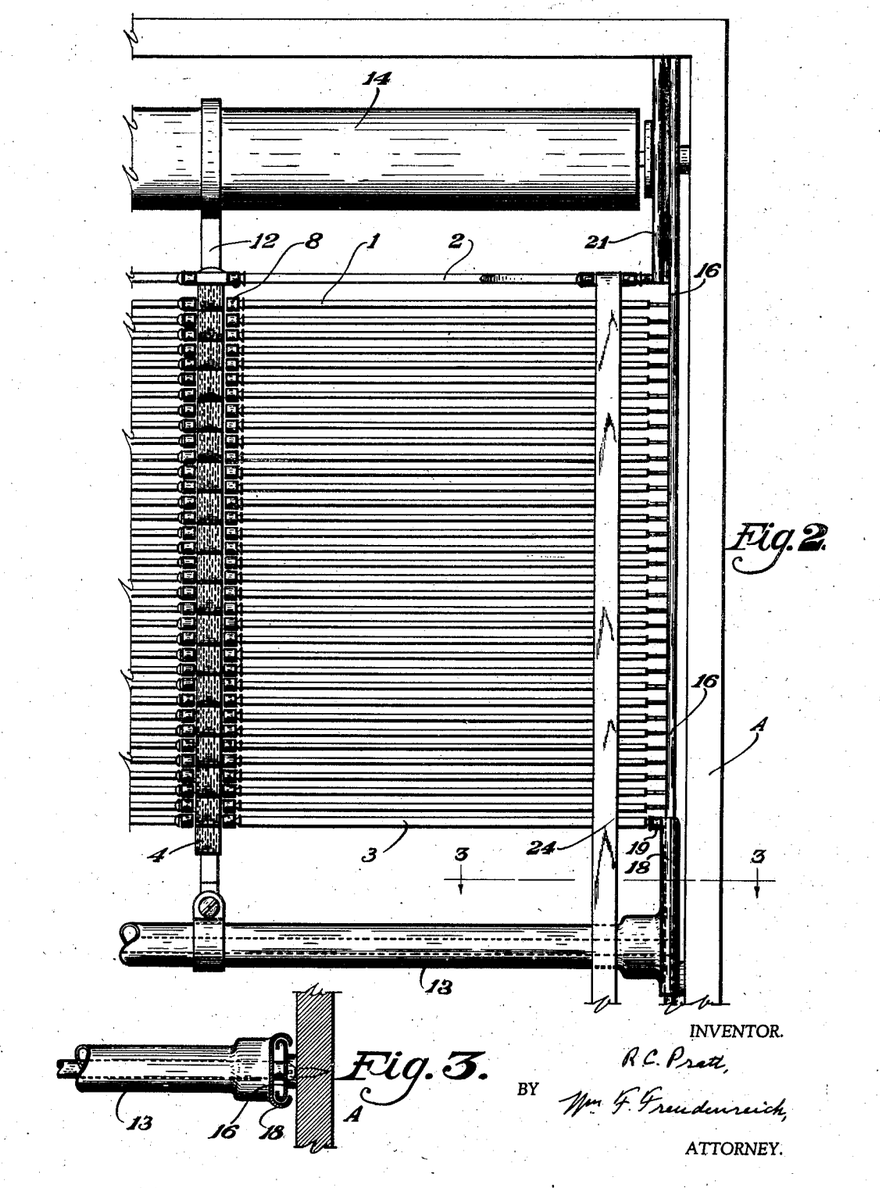
Fig. 2 is a view similar to Fig. 1, on a much larger scale, showing only a fragment of the blind and window frame and the blind being in its raised position, whereas in Fig. 1 it is in its lowered position.
Fig. 3 is a section on line 3—3 of Fig. 2, showing only fragments of the window frame and of the shade stick.
Figure 4:
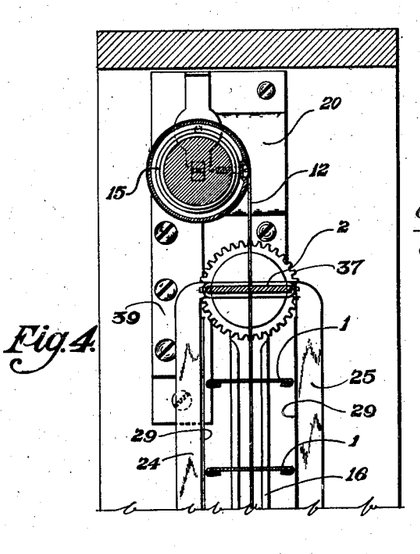
Fig. 4 is a section on line 4—4 of Fig. 1, on a larger scale, and showing the slats standing horizontal instead of vertical.

As heretofore stated, the spring in the shade roller tends constantly to lift the blind, but is restrained by the action of the locking shade stick. Upon pressing the finger pieces 22 at the middle of the shade stick, the stick becomes free to move up or down and, therefore, the shade roller winds up the thin, flexible suspending tapes 12 until the blind has been collapsed, as shown in Fig. 2. It will be seen that, when the blind is collapsed, the slats may approach each other until the clips thereon are all in contact with each other on opposite sides of the blind; the flexible webs 4 folding outwardly in each span between adjacent clips. Because of the flexibility of the metal webs, they will not project horizontally when folded, but will hang down in the form of loops and thus take up very little room.

It will be seen that, by making the suspending tapes 12 of thin material, they may be wound on the shade roller in accurately overlying layers, so that the lift or pull thereof is always in the vertical direction.

Figure 7:
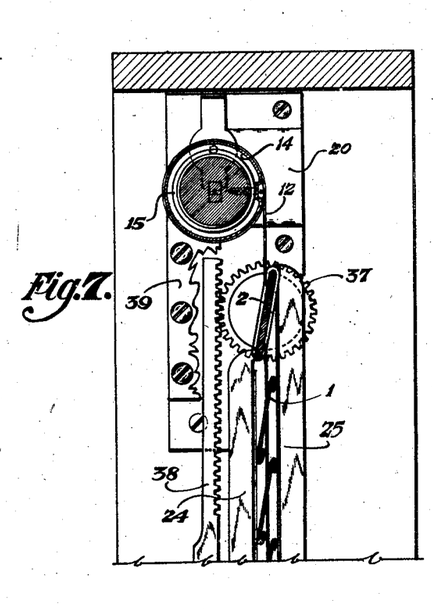
Fig. 7 is a view similar to Fig. 4, showing the slats in substantially upright positions.
Figures 8, 9:
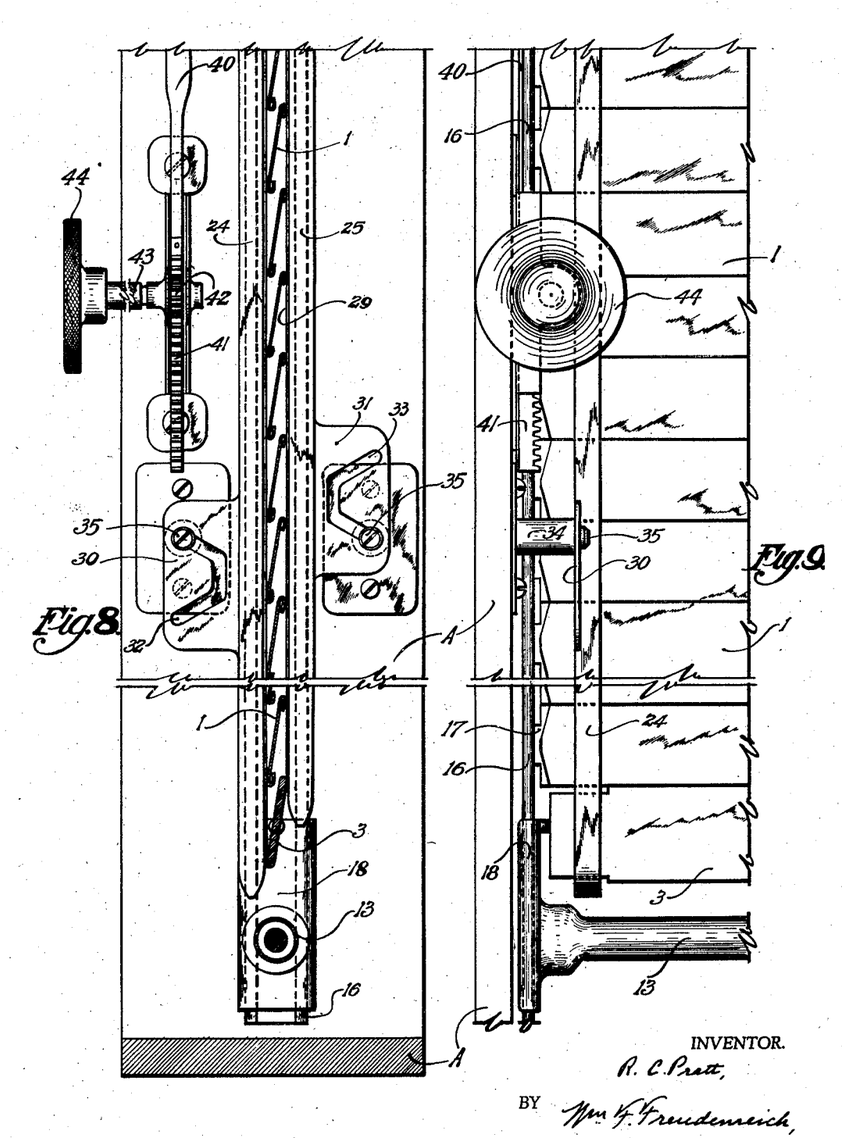
Fig. 8 is a view similar to Fig. 7, showing portions of the window below that appearing in Fig. 7.
Fig. 9 is a front elevation of the parts shown in Fig. 8, the window sill being omitted.
Figure 10:
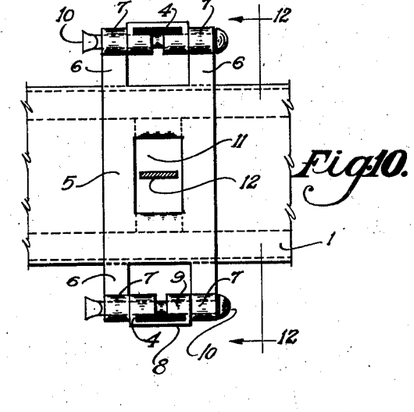
Fig. 10 is a horizontal section, on a still larger scale, through the shade, between two of the slats, while the slats are in horizontal positions, only a fragment being shown.

When the blind is down, the slats may be in approximately upright positions, as shown in Figs. 7, 8 and 9, thereby forming, in effect, a solid opaque panel. However, the slats may be turned so as to occupy any one of various angular positions to admit the passage of varying amounts of light or air, or both. Thus, in Figs. 1, 4 and 5, the slats are shown as occupying horizontal positions. Since the slats and the upper and lower tilting bars are tied together at their opposed long edges, each of these elements must move angularly about its long central axis to the same extent as do all the others, whenever there is any tilting action.

Figure 6:
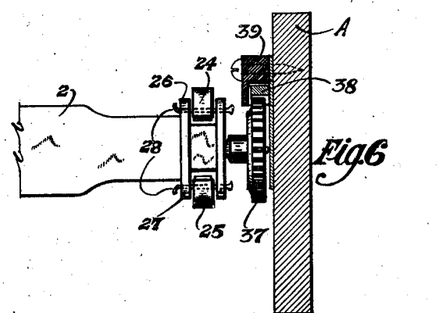
Fig. 6 is a section on line 6—6 of Fig. 5.

While the interlocking of the slats with the vertical side rails will hold the blind against flapping and rattling in windy weather, as long as the slats are horizontal, yet, when the slats are in other positions, the rails can serve only to limit the swaying movement of the blind and not to prevent it. I have, therefore, provided means for effectively holding the blind and all its parts stationary regardless of the angular positions of the slats. This I accomplish by means of four long vertical holding bars arranged in pairs 24 and 25 near the opposite vertical edges of the shade or blind; the bars 24 lying in front of the slats and the bars 25 lying behind the slats. These bars are hung from the tilting bar 2 at their upper ends. As best shown in Figs. 5 and 6, the bar 2 has at its front edge, near the ends thereof, pairs of ears 26, together with similar pairs of ears 27 at the rear edge. The bars 24 extend at their upper ends between the corresponding ears 26, whereas the bars 25 extend at their upper ends between the corresponding ears 27. The holding bars are connected to and suspended from the ears in which they lie by means of pins 28 extending through the bars and the adjacent ears. With this construction, the holding bars engage with the opposite long edges of the slats, remaining in engagement therewith as the slats are tilted. The holding bars may be faced on their inner edges, as indicated at 29 in Fig. 4, with a suitable cushioning material, such as leather or the like. Therefore, if the lower ends of the holding bars are controlled so that these bars always remain parallel with each other, the blind cannot at any time sway or rattle. In the arrangement shown, as will best be seen from Figs. 8 and 9, the bars 24 and 25 have thereon, near the lower ends thereof, laterally projecting plates 30 and 31 provided with cam slots 32 and 33, respectively. Fastened to and projecting from the vertical members of the window frame beside each of the plates 30 and 31 is a post 34. Headed screws 35 extend through the slots 32 and 33 into the corresponding stationary posts. The heads on the screws prevent the holding bars from swaying toward and from the sides of the window opening but do not prevent the plates 30 and 31 from being shifted on the screws within the limits of the slots in the plates. The slots are so designed that the holding bars may move up and down as the angular positions of the slats vary and, while making these vertical movements, remain in contact with the edges of the slats.

The slats may conveniently be shifted into any desired angular position by simply turning the upper tilting bar 2. I have provided suitable means for conveniently turning this bar. To this end, there is fixed to one end of the tilting bar a gear wheel 37 that meshes with a vertical, vertically-movable rack bar 38 held in mesh with the gear wheel by a stationary guide 39. This rack bar is attached to the upper end of a long rod 40 that extends down along one of the side members of the window frame to a point near the bottom of the window and is there provided with a toothed or rack section 41. Meshing with the teeth of the section 41 is a pinion 42 on the end of a shaft or stem 43 provided with a button or head 44 by means of which it may be turned. By the mere act of turning the handle or button 44 the slats may be adjusted into any angular position within the limits of movement of the slats.

Figure 16:
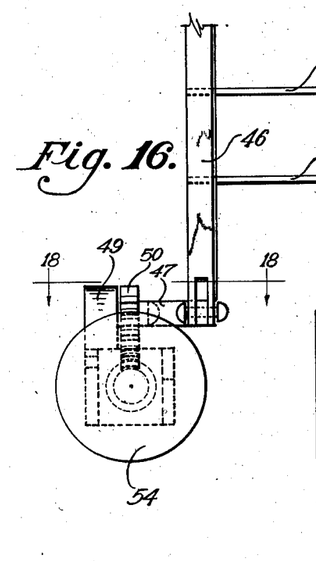
Fig. 16 is a front elevation of a modified form of operating means for the slat-engaging and holding members, together with fragments of such members and of two of the slats.
Figure 17:
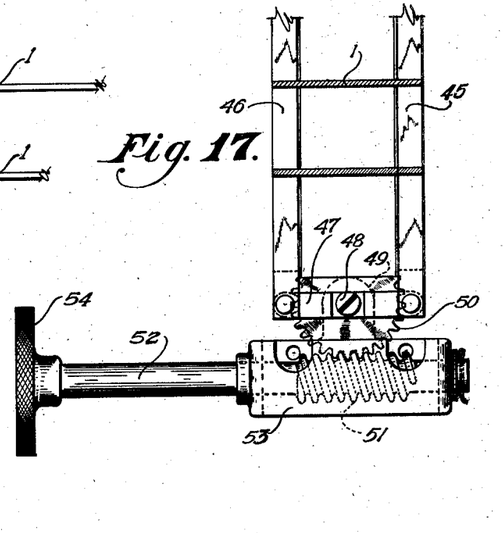
Fig. 17 is a view looking at the construction of Fig. 16 from the right-hand side of that figure, the slats being shown in section.
Figure 18:
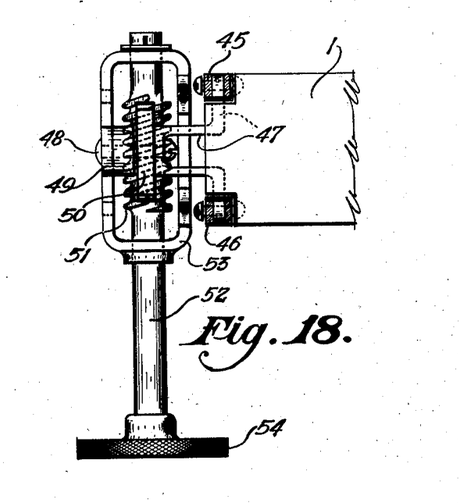
Fig. 18 is a section on line 18—18 of Fig. 16.

In Figs. 16–18, I have shown a modified operating means for the holding bars that locks them in any position into which they may be brought. Lying between the lower ends of the bars 45 and 46 of each pair is a bracket 47, hinged at its ends to the bars and supported at the middle for swinging movements, conveniently by passing a pin 48 through the bracket and a stationary part 49. At least one of the brackets has a worm wheel segment 50 fixed thereto with its center at the pivotal axis of the bracket. Engaged with the worm wheel segment is a worm 51 on a stem or shaft 52 journalled in a stationary member 53 which may be integral with the stationary element 49. On the outer end of the stem or shaft 52 is a button or head 54 for turning the same. When the member 54 is turned, the holding bars 45 and 46 are moved lengthwise and from or toward each other, as the case may be, causing the upper tilting bar and the slats to be turned and to be locked in any angular positions into which they may be brought.

Figure 19:
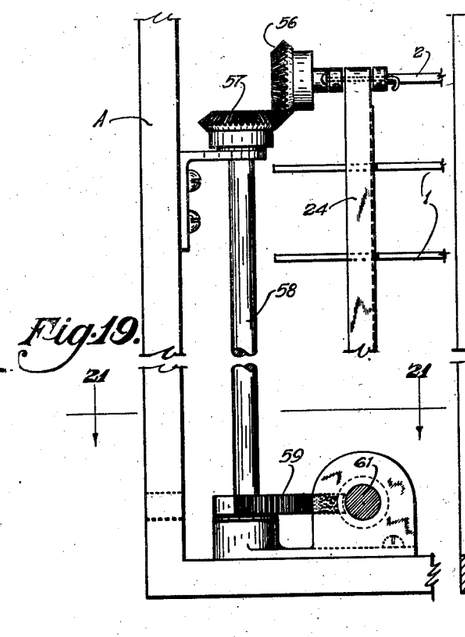
Fig. 19 is a front elevation of fragments of a window frame and one of the blinds, illustrating a modified form of slat-engaging, blind-holding means.
Figure 20:
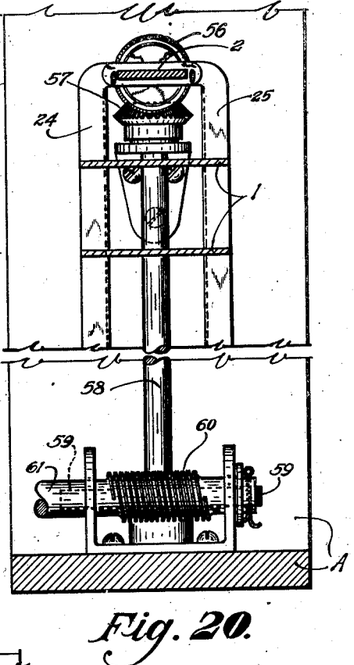
Fig. 20 is a view looking at the construction shown in Fig. 19 from a point toward the right of Fig. 19, the window sill being shown in section.
Figure 21:
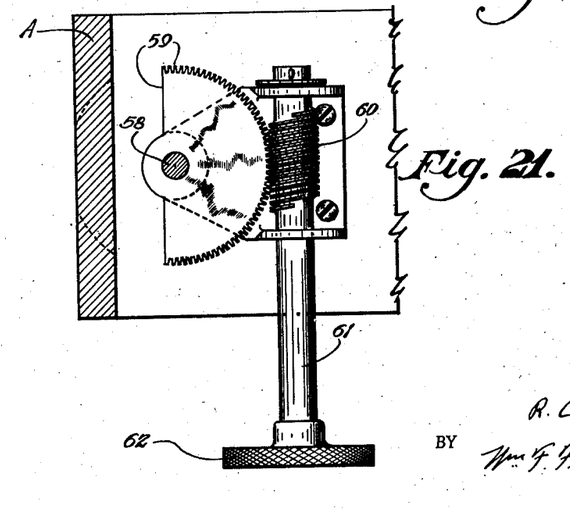
Fig. 21 is a section on line 21—21 of Fig. 19.

In Figs. 19–21, I have shown another modified mechanism for turning and locking the slats and operating and locking the holding bars. In this arrangement the upper tilting bar 2 has a bevel pinion 56 on one end instead of the spur gear of the first form. Meshing with the pinion 56 is a complementary gear 57 on the upper end of a vertical shaft 58 at one side of the window opening. On the lower end of the shaft 58 is a worm wheel 59 engaged by a worm 60. The worm 60 is on a shaft 61 having at its outer end a button or head 62 by which it may be turned. In this form of my invention, the operation of the shade or blind is the same as in the first form except worm devices and bevel gears replace two racks and pinions; the result being, however, that the holding bars and the slats and tilting bars are locked in the various positions into which they are brought by turning the operating button or head.

The slats of which the blind is made may take any one of a variety of forms. Thus, in Figs. 22 and 27 is shown a slat composed of a sheet metal tube flattened to produce two longitudinal flat sections 65, 65 lying on opposite sides of a central tubular section 66.

Figures 23, 24, 28, 29, 32, 33:
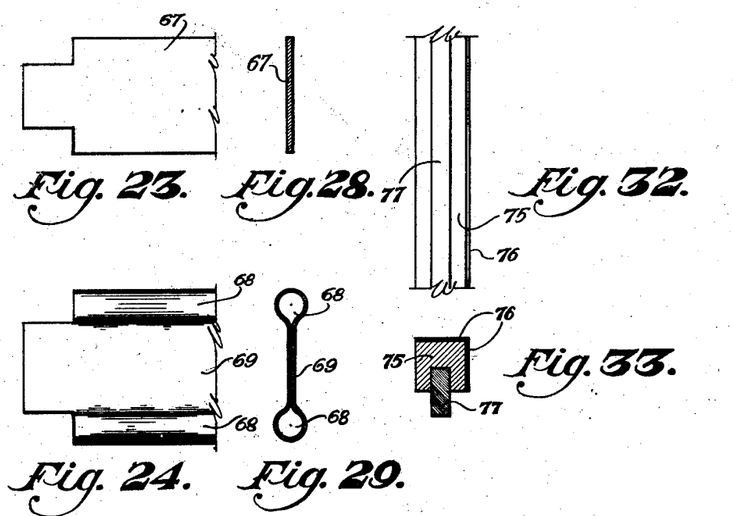
Fig. 32 is an elevation of a fragment of a modified form of slat-engaging member for holding the blind.
Fig. 33 is a transverse section through the members shown in Fig. 32.

The slat shown in Figs. 23 and 28 consists of a flat strip of thicker metal than that of which the other slats which I have illustrated are made.

Figures 22, 27:
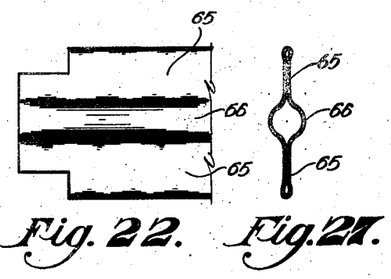
Figs. 22, 23, 24, 25 and 26 are elevations, showing end portions of five different modified forms of slats.
Figs. 27, 28, 29 and 30 are cross sections through the slats shown in Figs. 22, 23, 24 and 25, respectively.

In Figs. 24 and 29 is shown a slat similar to that in Figs. 22 and 27, excepting that the sheet metal tubular member is flattened to provide edge elements 68, 68 in the form of tubes of small diameter extending throughout the length of the slat, whereas the central panel of the slat is a flat strip of twice the thickness of the metal of which the original tube was made.

Figures 25, 30:
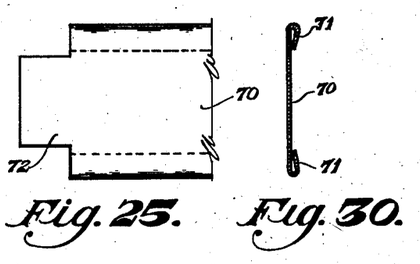

In Figs. 25 and 30 is shown a slat similar to that illustrated in Figs. 1–15; the same being composed of a flat strip 70 having marginal portions 71 at the long edges curled or rolled inwardly to form stiffening beads. The difference between this slat and the one shown in Figs. 1–15 is that the end piece 72, corresponding to the end piece 17 in Fig. 14, is a continuation of the body portion of the slat instead of being a separate piece.

Figures 26, 31:
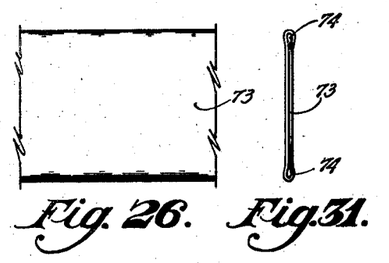
Fig. 31 is an end view of the slats shown in Fig. 26.

The slat shown in Figs. 26 and 31 consists of a sheet metal tube collapsed to produce a flat strip 73; the collapsing being not quite completed adjacent to the longitudinal edges of the strip, whereby the strip will be bounded at its long edges by small, hollow, tube-like sections 74.

In Figs. 32 and 33, I have shown a modified form of holding bar which may consist of a wooden bar 75 faced on two sides with leather or other cushioning material 76. Set on edge into one side of the bar and extending lengthwise thereof is a flat metal bar 77.

The particular construction of several of the slats per se and the method of making them are disclosed and claimed in applicant's co-pending application Serial No. 724,935, filed May 10, 1934.

It will thus be seen that I have produced a simple and novel Venetian blind which, even though of metal, may be rustproof and noiseless in operation; which is supported and controlled in such a manner that it may be operated as simply and easily as an ordinary shade hung from a spring roller, while retaining all of the advantages resulting from the slat construction of this type of blind; which will not sway or rattle when winds or air currents are blown against it; in which the angle of the slats may be easily adjusted; in which the movable parts may be locked in stationary positions, not only to prevent swaying, flapping, or rattling of the blind, but to hold the slats fixed in any angular positions into which they may be adjusted; in which the slats may be locked in substantially vertical positions so as to give the effect of a blind in the form of a single sheet; and which makes it possible to set the slats at any desired angle to deflect any quick incoming currents of air, provide a shield against the sun's rays without darkening the opening in which the blind is placed, and permit a person to look out through the blind without allowing others to look in. Therefore, my improved blind, while not limited in its use to that field, is especially applicable to railway passenger cars and the like.

While I have illustrated and described with particularity only a single preferred form of my invention, with a few modifications, I do not desire to be limited to the exact structural details thus illustrated and described; but intend to cover all forms and arrangements which come within the definitions of my invention constituting the appended claims.

I claim:

1. The combination with a Venetian blind, of rigid holding bars extending lengthwise thereof on opposite sides thereof, and means to hold said bars stationary and in contact with the slats of the blind in all of the various angular positions of the slats.

2. The combination with a Venetian blind including a series of slats and flexible connecting means between the same, said blind having at one end a slat in the form of a bar, means to support the bar for tilting movements about its long central axis, vertical holding bars hung from the tilting bar in front of and behind the blind, the distance between upper ends of the holding bars when the slats are horizontal being equal to the width of the slats, and means cooperating with the lower ends of the holding bars to keep them vertical in all angular positions of the tilting bar.

3. The combination with a Venetian blind having at one end a slat in the form of a bar, means to support the bar for tilting movements about its long central axis, vertical holding bars hung from the tilting bar in front of and behind the blind, the distance between upper ends of the holding bars when the slats are horizontal being equal to the width of the slats, a stationary member, connections between the lower ends of the holding bars and said stationary member to keep the holding bars in contact with the slats as the slats are turned, a handle, and means controlled by the handle to turn the tilting bar.

4. The combination with a Venetian blind including a series of slats and flexible connecting means between the same, said blind having at one end a slat in the form of a bar, means to support the bar for tilting movements about its long central axis, vertical holding bars hung from the tilting bar in front of and behind the blind, the distance between upper ends of the holding bars when the slats are horizontal being equal to the width of the slats, and means including a worm and a worm wheel to turn the tilting bar and lock it in any position into which it may be brought.

5. The combination with a Venetian blind having at one end a slat in the form of a bar, means to support the bar for tilting movements about its long central axis, vertical holding bars hung from the tilting bar in front of and behind the blind, the distance between upper ends of the holding bars when the slats are horizontal being equal to the width of the slats, a cross piece extending between and hinged at its ends to the lower ends of said holding bars, means acting on said cross piece to restrain it against movements except swinging movements about an axis parallel with the tilting axis of the tilting bar, a worm wheel fixed to said cross piece, a worm meshing with said wheel, and a finger piece to turn the worm.

6. The combination with a window frame, of upright rails secured at opposite sides thereof, said rails having troughs on their inner sides, a shade containing transverse metal slats mounted in said frame, and rigid members of sound-deadening material secured rigidly to the ends of the slats and extending freely into the troughs of the rails and holding the metal of the slats away from said rails.

7. A blind composed of metal slat-like members, and flexible bands of metal webbing extending from top to bottom on opposite sides of the said members, clips embracing and gripping said bands, and means pivotally connecting the clips to the long edges of said members.

8. A slat shade comprising a plurality of metal slats, means for suspending the slats in superposed spaced relation, means for moving the slats relatively toward each other, guides adjacent the sides of the shade for guiding the slats in their movement, and rigid members of sound-deadening material different from the material of which the slats are composed secured rigidly to the slats and freely engageable with the guides.

9. A slat shade comprising a plurality of slats, means for securing the slats in superposed spaced relation, a spring having connections for moving the slats relatively toward each other, primary guiding means for guiding the slats in their movements, supplemental guiding means, and means for adjusting the angularity of the slats, said supplemental guiding means being maintained in engagement with opposite edges of the slats in all angular positions thereof.

10. A slat shade comprising a plurality of slats, means for securing the slats in superposed spaced relation, means for moving the slats relatively toward each other, and means for adjusting the angularity of the slats, said adjusting means comprising an oscillatable cross member, connections from the member to the slats, a gear secured to the member, a second gear adapted for manual operation, and a toothed rack in operative engagement with both of said gears.

RAYMOND C. PRATT.